United States Patent
Takei et al.

(10) Patent No.: US 11,307,630 B2
(45) Date of Patent: Apr. 19, 2022

(54) ELECTRONIC DEVICE AND METHOD EXECUTED BY THE ELECTRONIC DEVICE

(71) Applicant: RICOH COMPANY, LTD., Tokyo (JP)

(72) Inventors: Teruyuki Takei, Tokyo (JP); Yoshitaka Kimura, Tokyo (JP); Takahiro Suzuki, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/337,640

(22) Filed: Jun. 3, 2021

(65) Prior Publication Data

US 2021/0397241 A1   Dec. 23, 2021

(30) Foreign Application Priority Data

Jun. 18, 2020 (JP) .............................. JP2020-105615

(51) Int. Cl.
| | |
|---|---|
| *G06F 1/18* | (2006.01) |
| *G06F 1/26* | (2006.01) |
| *G06F 1/28* | (2006.01) |
| *G06F 1/32* | (2019.01) |
| *G06F 1/3212* | (2019.01) |

(52) U.S. Cl.
CPC ............ *G06F 1/3212* (2013.01); *G06F 1/189* (2013.01); *G06F 1/263* (2013.01); *G06F 1/28* (2013.01)

(58) Field of Classification Search
CPC ........ G06F 1/3212; G06F 1/189; G06F 1/263; G06F 1/28
See application file for complete search history.

(56) References Cited

U.S. PATENT DOCUMENTS

| | | | |
|---|---|---|---|
| 2018/0004277 A1* | 1/2018 | Matsui | ............... G06F 13/4072 |
| 2018/0181177 A1* | 6/2018 | Fukute | ............... H04N 1/00907 |
| 2019/0286204 A1 | 9/2019 | Kimura | |
| 2019/0288519 A1 | 9/2019 | Takei et al. | |
| 2019/0289211 A1 | 9/2019 | Asakura et al. | |

* cited by examiner

Primary Examiner — Mark A Connolly
(74) Attorney, Agent, or Firm — Xsensus LLP

(57) ABSTRACT

An electronic device electrically connectable to an external device includes: circuitry configured to: accept, from a user, a selection of one of: a first state that enables the electronic device to supply electric power to the external device; and a second state that enables the electronic device to receive electric power from the external device; and switch a state of the electronic device to the selected one of the first state and the second state and fix the selected one of the first state and the second state as the state of the electronic device in response to power off of the electronic device.

7 Claims, 5 Drawing Sheets

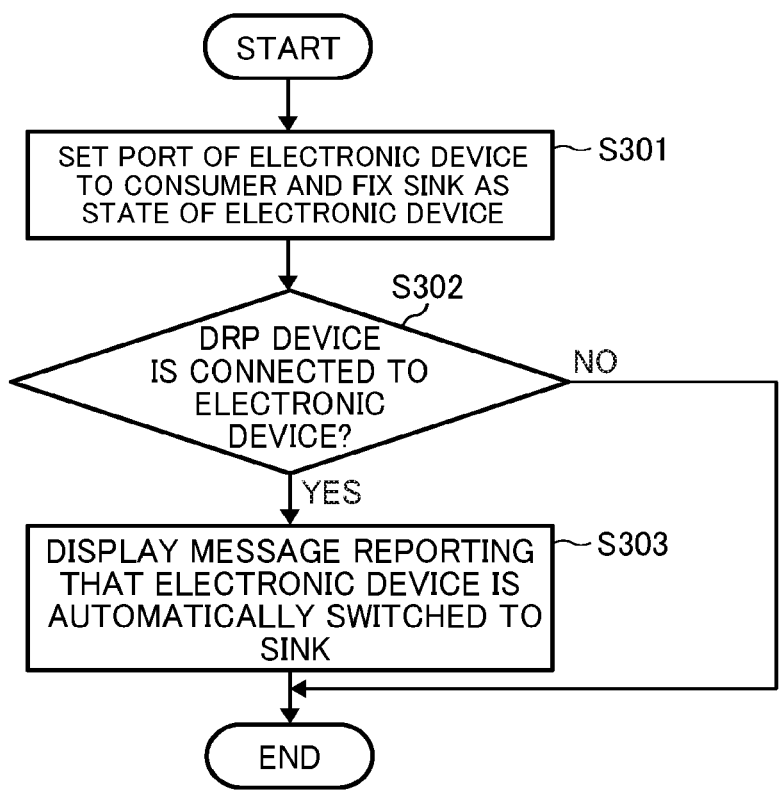

ELECTRONIC DEVICE AND METHOD EXECUTED BY THE ELECTRONIC DEVICE

CROSS-REFERENCE TO RELATED APPLICATIONS

This patent application is based on and claims priority pursuant to 35 U.S.C. § 119(a) to Japanese Patent Application No. 2020-105615, filed on Jun. 18, 2020, in the Japan Patent Office, the entire disclosure of which is hereby incorporated by reference herein.

BACKGROUND

Technical Field

Embodiments of the present disclosure relate to an electronic device and a method executed by the electronic device.

Related Art

Electronic devices compatible with a universal serial bus (USB)-power delivery (PD) are known. An example of such electronic devices is a dual-role power (DRP) device provided with a DRP port that enables selectively supplying and receiving of electric power; and a configuration channel (cc) terminal for recognizing the connection between the electronic devices.

SUMMARY

In one aspect of this disclosure, there is described an electronic device electrically connectable to an external device includes: circuitry configured to: accept, from a user, a selection of one of: a first state that enables the electronic device to supply electric power to the external device; and a second state that enables the electronic device to receive electric power from the external device; and switch a state of the electronic device to the selected one of the first state and the second state and fix the selected one of the first state and the second state as the state of the electronic device in response to power off of the electronic device.

In another aspect of this disclosure, there is disclosed a method executed by an electronic device connectable to an external device including: accepting, from a user, a selection of one of: a first state that enables the electronic device to supply electric power to the external device; and a second state that enables the electronic device to receive electric power from the external device; and switching a state of the electronic device to the selected one of the first state and the second state and fixing, as the state of the electronic device, the selected one of the first state and the second state in response to power off of the electronic device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 5 is a flowchart of a process executed in response to turning on the electronic device during the process in FIG. 4.

Figure 1:
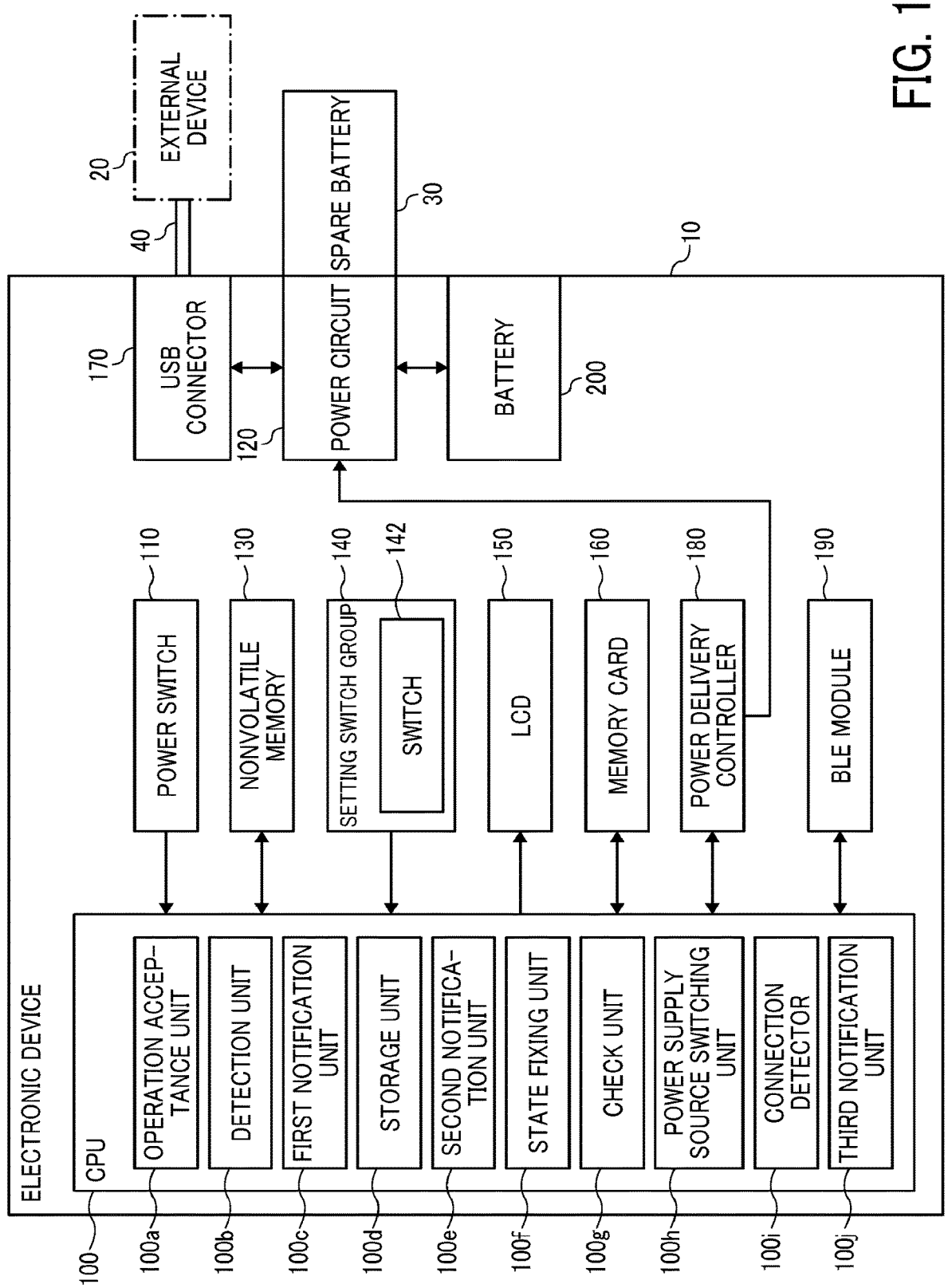
FIG. 1 is a block diagram of a configuration of an electronic device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The embodiments of the present disclosure provide an electronic device and its method that enables the electronic device to be in a user's desired state during the power off of the electronic device.

In this specification, a port of a DRP device or a device (e.g., a USB charger that is non-compliant a USB-PD) that supplies power, that is, a port capable of supplying power, is referred to as a provider. Further, a port that serves to supply power with the cc terminal pulled up by a pull-up resistor in the DRP terminal is referred to as a source. In addition, a port of a DRP device or another device (e.g., a notebook personal computer (PC) that is non-compliant with a USB-PD), that is, a port capable of receiving power, is referred to as a consumer. Further, a port that serves to receive power with the cc terminal pulled down by a pull-down resistor in the DRP device is referred to as a sink.

Hereinafter, an electronic device according to an embodiment of the present disclosure is described with reference to the drawings. In the following description, common or corresponding elements are denoted by the same or similar reference numerals, and redundant description thereof is omitted.

FIG. 1 is a block diagram of a configuration of an electronic device 10 according to an embodiment of the present disclosure. The electronic device 10 is connectable with external device 20 as another electronic device indicated by a dashed line in FIG. 1, and capable of switching its connection state between the source (a first state) that enables electric power to be supplied to the external device 20 and the sink (a second state) that enables electric power to be received from the external device 20. In the present embodiment, the electronic device 10 is a DRP device having a DRP port compliant with a USB-PD.

Examples of the electronic device 10 include a digital single-lens reflex camera, a mirrorless single-lens camera, a compact digital camera, a video camera, a monitoring camera, a camcorder, a desktop PC, a notebook PC, a tablet terminal, a personal handy phone system (PHS), a smartphone, a smart watch, a feature phone, a game machine, a music player, a TV, a mobile battery, a projector, various peripheral devices such as a printer and a storage, and various accessories such as a strobe, a GPS unit, and an external finder.

As illustrated in FIG. 1, the electronic device 10 includes a central processing unit (CPU) 100, a power switch 110, a power circuit 120, a nonvolatile memory 130, a setting switch group 140, a liquid crystal display (LCD) 150, a memory card 160, a USB connector 170, a power delivery controller 180, a Bluetooth (registered trademark) low energy (BLE) module 190, and a battery 200.

FIG. 1 indicates the functional configuration of the CPU 100. The CPU 100 includes, as a functional configuration, an operation acceptance unit 100a, a detection unit 100b, a first notification unit 100c, a storage unit 100d, a second notification unit 100e, a state fixing unit 100f, a check unit 100g, a power supply source switching unit 100h, a connection detector 100i, and a third notification unit 100j.

FIG. 1 includes an overall configuration of the electronic device as a DRP device; a specific configuration of the electronic device 10 including elements (e.g., a solid-state imaging element and an image-capturing lens in a digital single-lens reflex camera, a monitor display and a hard disk drive (HDD) in a PC, or a flash lamp and a trigger circuit in a strobe); and a commonly-used configuration including a housing.

The battery 200, one of a first battery and a second battery, is detachably attached to a battery chamber in the electronic device 10. The battery 200 attached to the battery chamber allows electrical connection between the battery 200 and the power circuit 120. In other words, the battery 200 is connectable and unconnectable to the power circuit 120. The battery 200 discharges electric power by supplying electric power to the consumer when the electronic device 10 is set to the source and receives electric power from the provider when the electric device 10 is set to the sink.

The electronic device 10 has a spare battery 30, the other one of the first battery and the second battery, detachably attached thereto. For example, the electronic device 10 and the spare battery 30 are electrically and mechanically connected to each other by connecting male and female connectors of the electronic device 10 and the spare battery 30. This electrical and mechanical connection between the electronic device 10 and the spare battery enables the electronic device 10 to continue to operate with electric power from the spare battery 30 when the remaining capacity of the battery 200 runs out. In this configuration, the spare battery 30 is connectable and unconnectable to the power circuit 120.

The power switch 110 is, for example, a mechanical switch provided in the housing of the electronic device 10. In response to pressing the power switch 110 by a user, an ON signal is input to the power circuit 120, and the electronic device 10 is powered on. Specifically, when the ON signal is input to the power circuit 120, power is supplied to each part of the electronic device 10 via the power delivery controller 180, and the system of the electronic device 10 is activated (i.e., the electronic device 10 is powered on).

The power switch 110 is, for example, an alternate switch. In such a configuration, in response to pressing the power switch 110 by a user when the electronic device 10 is powered on, an OFF signal is input to the power circuit 120, and the electronic device 10 is powered off. Notably, during the power off of the electronic device 10, the system of the electronic device 10 is stopped, and a circuit such as a timer operates.

The power supply source to the power circuit 120 is, for example, the battery 200 or a commercial power supply. The electronic device 10 basically operates with power supplied from the battery 200. However, the electronic device 10 receives electronic power to operate from a commercial power supply when connected to the commercial power supply. In some examples, the electronic device 10 with the spare battery 30 attached operates with power supplied from the spare battery 30.

The CPU 100 accesses the nonvolatile memory 130, reads out the control program, loads the control program into the work area, and executes the loaded control program, to control the entire operations of the electronic device 10.

The nonvolatile memory 130 stores, in addition to the control program, control parameters used for executing the control program, various setting information of the electronic device 10, and data (for example, image data) generated by the electronic device 10.

The setting switch group 140 includes, for example, a plurality of mechanical switches for changing various settings of the electronic device 10. In response to pressing any switch of the setting switch group 140, the CPU 100 accesses the nonvolatile memory 130, reads out setting information corresponding to the pressed switch, and changes the setting of the electronic device 10 according to the read setting information. The changed setting information is displayed, for example, on the LCD 150.

The setting switch group 140 includes a switch 142 for setting the port of the electronic device 10 to the provider or the consumer in response to power-off of the electronic device 10. The CPU 100 accepts an input signal from the switch 142. The switch operation of setting the port of the electronic device 10 to the provider is an operation of setting the electronic device 10 to the source. The switch operation of setting the port of the electronic device 10 to the consumer is an operation of setting the electronic device 10 to the sink. In this configuration, the CPU 100 serves as an operation acceptance unit 100a that accepts an operation (i.e., a selection of one of the source and the sink for the electronic device 10) input by a user to select the source or the sink to be set for the electronic device 10.

In some examples, the LCD 150 is a touch screen. In such examples, a user touches the menu screen displayed on the LCD 150 to set the port of the electronic device 10 to the provider or the sink.

The memory card 160 is a storage medium attachable to and detachable from a slot in the electronic device 10, and is, for example, a secure digital (SD) memory card. The memory card 160 stores, for example, data (for example, image data) generated by the electronic device 10.

The USB connector 170 is a connector compliant to the USB-PD standard, and is, for example, a USB Type-C connector. To the USB connector 170, for example, a USB Type-C cable (hereinafter referred to as a USB cable 40)

based on the USB-PD standard is connected. The external device 20 is electrically connected to the electronic device 10 via the USB cable 40.

The power delivery controller 180 transmits information on power reception and supply to the external device 20 via the USB connector 170 and the USB cable 40, and controls power reception to and power supply from the electronic device 10.

The BLE module 190 is compliant to the BLE wireless communication standard for wirelessly connecting short-range electronic devices to each other. Even during the power-off of the electronic apparatus 10, the BLE module 190 operates in the low consumption mode. The BLE module 190 enables the electronic device 10 to wirelessly communicate with a short-range electronic device.

A case in which the electronic device 10 is connected to the external device 20 that is a DRP device is described below. As the external device 20, which is a DRP device, has the same configuration as the electronic device 10, the illustration of the specific configuration of the external device 20 is omitted.

The USB cable 40 includes power supply lines, including a $V_{BUS}$ line connecting the $V_{BUS}$ terminal of the electronic device 10 and the $V_{BUS}$ terminal of the external device 20 and a GND line connecting the GND terminal of the electronic device 10 and the GND terminal of the external device 20. The USB cable 40 further includes a configuration channel (cc) line for recognizing connection between devices.

Figure 2:
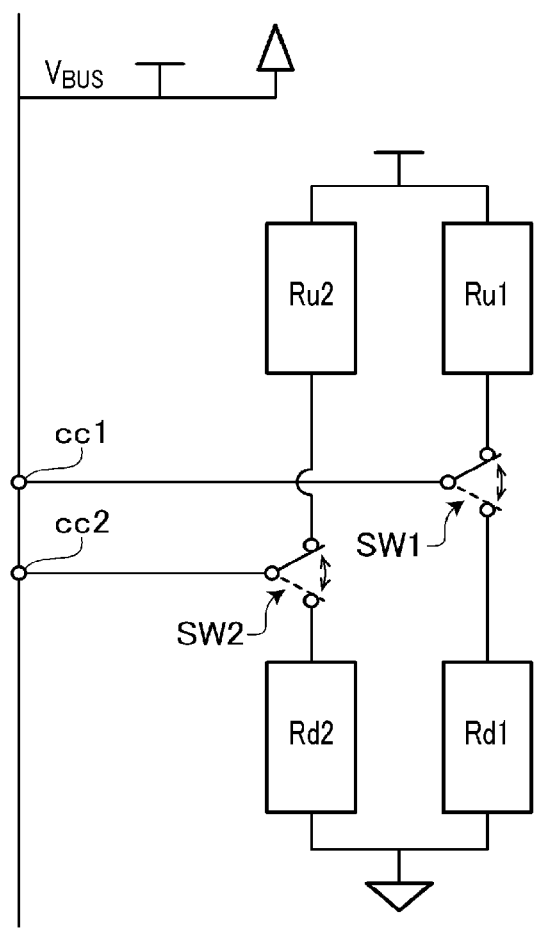
FIG. 2 is a circuit diagram of a part (a USB connector and its peripheral circuit) of the electronic device according to an embodiment of the present disclosure.

FIG. 2 is a circuit diagram of the USB connector 170 and a circuit (a part of the circuit in the power circuit 120) subsequent to the USB connector 170.

The USB connectors of the electronic device 10 and the external device 20 are USB Type-C connectors, either ends of which are reversibly connectable in two opposite directions. To allow such a reversible connection, the USE connector is provided with a pair of cc terminals (i.e., a cc1 terminal and a cc2 terminal). For connection in one direction, the cc1 terminal of the electronic device 10 and the cc1 terminal of the external device 20 are connected via the USE cable 40 (i.e., the cc line), whereas for connection in the other direction, the cc2 terminal of the electronic device 10 and the cc1 terminal of the external device 20 are connected via the cc line. In each of the electronic device 10 and the external device 20, the connection direction of the USB connector is detected from the combination of the cc terminals connected via the cc line.

The cc1 terminal is selectively connected to the pull-up resistor Ru1 or the pull-down resistor Rd1 by the operation of the changeover switch SW1. The cc2 terminal is selectively connected to the pull-up resistor Ru2 or the pull-down resistor Rd2 by the operation of the changeover switch SW2.

In the DRP device, the pull-up resistor and the pull-down resistor are periodically and alternately connected to the cc terminal. Such an alternate connection enables one of the DRP devices to be a source and the other one to be a sink upon the connection between the DRP devices via the USB cable 40.

In addition, when the DRP devices are connected to each other via the cc line, the potential of the cc terminal changes because of voltage division by the pull-up resistor and the pull-down resistor of each DRP device. This change in the potential of the cc terminal enables detection of the connection between the DRP devices and stops the switching operation of the respective changeover switches SW1 and SW2. In other words, the DRP device, which is enabled as the source, maintains the cc terminal connected to the pull-up resistor, and the other DRP device, which is enabled as the sink, maintains the cc terminal connected to the pull-down resistor.

In response to detection of the connection between the electronic device 10 and the external device 20, a supply voltage of 5 V is supplied from the source to the sink through the $V_{BUS}$ line. Then, a negotiation takes place between the source and the sink. The negotiation is performed between the power delivery controllers of the electronic device 10 and the external device 20. This negotiation enables one profile to be selected from a plurality of profiles (combinations of voltage and maximum current that can be supplied by the source), and the supply voltage to be supplied through the $V_{BUS}$ line is changed from the 5 V according to the selected profile. When the negotiation is completed, the supply voltage of 5 V or a supply voltage after changing its setting is supplied from the source to the sink.

In a DRP device according to a comparative example, a user is unable to select the state of the DRP device during the power off. In other words, a user is unable to set the DRP device to a user's desired state during the power off.

In contrast, the electronic device 10 according to an embodiment of the present disclosure can be set to a user's desired state during the power off of the electronic device 10 by executing a state fixing process to be described below.

Figure 3:
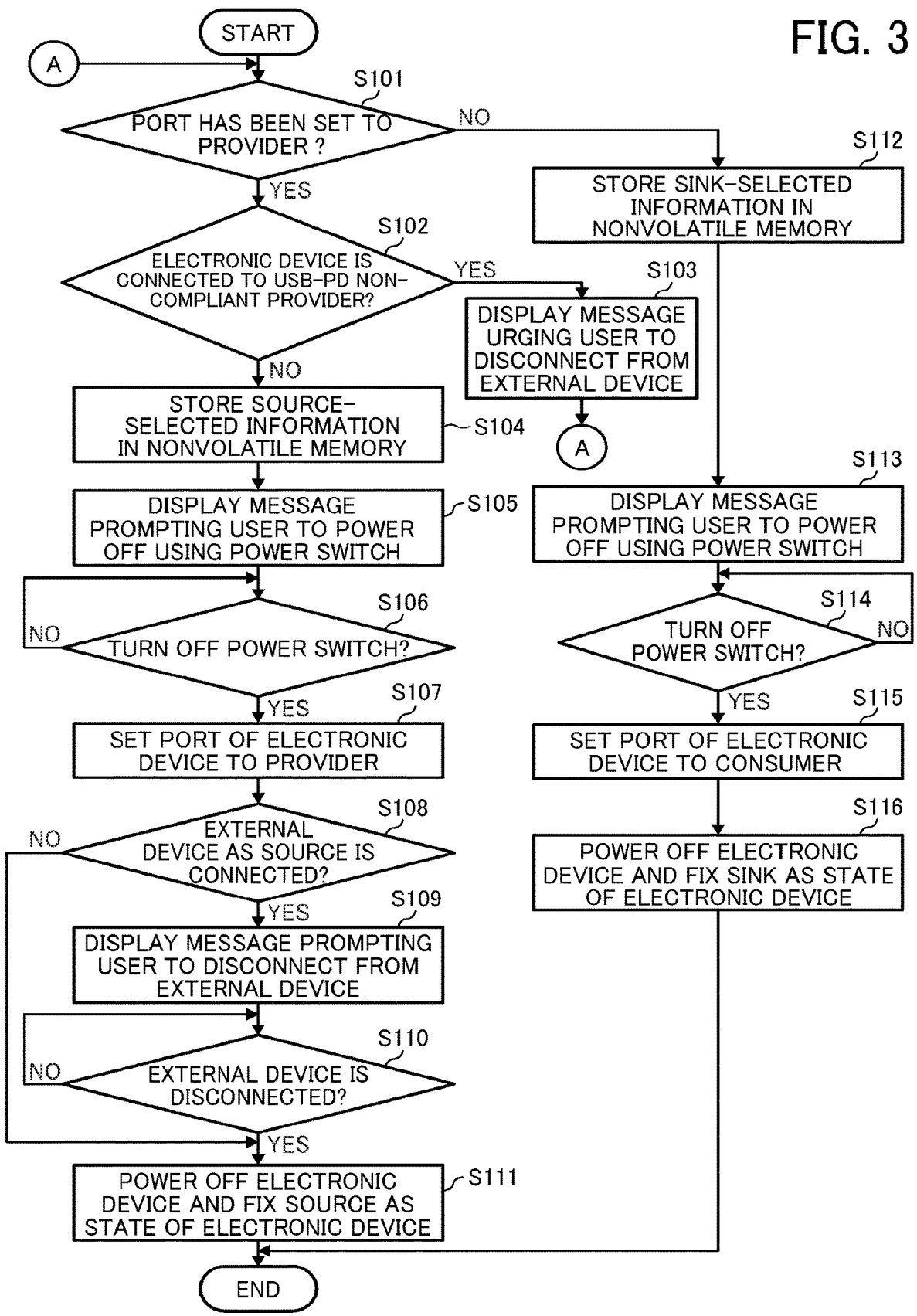
FIG. 3 is a flowchart of a state fixing process, according to an embodiment of the present disclosure.

FIG. 3 is a flowchart of the state fixing process executed by the CPU 100, according to an embodiment of the present disclosure. The state fixing process in FIG. 3 starts in response to an operation applied to the switch 142 during the power-on of the electronic device 10.

In step S101, the CPU 100 determines whether the port of the electronic device 10 has been set to the provider in response to powering off the electronic device 10, in accordance with a signal input from the switch 142.

In a case where the external device 20 that is unable to receive electric power from the electronic device 10 is connected to the electronic device, the external device 20 cannot be set to the sink, and the electronic device 10 cannot be set to the source. A provider that is non-compliant with the USB-PD is described as an example of the port of the external device that is unable to receive electric power from the electronic device 10. A device having such a port is, for example, a USB charger.

When the port of the electronic device 10 has been set to the provider in accordance with a signal input from the switch 142 (YES in step S101), the CPU 100 determines whether the USB-PD non-compliant provider is connected to the electronic device 10 (in other words, whether the source is detected as the state of the external device 20 that is non-compliant with the USB-PD) in step S102.

Specifically, the CPU 100 attempts to detect the pull-up resistor of the cc terminal and communicate with the cc terminal. If the detection and communication result in an error, the CPU 100 determines that the USB-PD non-compliant provider is connected to the electronic device 10.

In other words, the CPU 100 operates as a detection unit 100b that detects whether the external device 20 connected to the electronic device 10 can receive electronic power from the electronic device 10.

When the USB-PD non-compliant provider is connected to the electronic device 10 (YES in step S102), the CPU 100 displays a message for prompting the user to disconnect the connection (more specifically, electrical connection) of the external device 20 to the electronic device 10 on the LCD 150 in step 103, and returns to the process in step 101.

In some examples, the electronic device 10 is provided with an indicator lamp, and the CPU 100 controls the indicator lamp to change its lighting state instead of or in addition to displaying the message to prompt the user to disconnect the external device 20 from the electronic device 10. In some other cases, the electronic device 10 is provided with a speaker, the CPU 100 causes the speaker to output an alert sound instead of or in addition to notifying a user with a visual means (e.g., displaying a message or lighting an indicator lamp), to prompt the user to disconnect the external device 20 from the electronic device 10. In some still other cases, the electronic device 10 is provided with a haptic device, and the CPU 100 causes a user to perceive vibration with the haptic device instead of or in addition to notifying a user with such visual means or acoustic means (e.g., outputting an alert sound), to prompt the user to disconnect the external device 20 from the electronic device 10.

In other words the CPU 100 operates as a first notification unit 100c that notifies a user to prompt disconnection from the external device 20 when determining that the external device 20 connected to the electronic device 10 is unable to receive electronic power from the electronic device; and that the state selected by a user is the source.

Disconnection from the external device 20 (e.g., removing the USB cable 40 from the USB connector 170) by the user that has received such a notification prevents the state of the electronic device 10 from being the source while the USB-PD non-compliant provider is connected to the electronic device 10.

When the USB-PD non-compliant provider is not connected to the electronic device (NO in step S102), the CPU 100 stores, in the nonvolatile memory 130, information (hereinafter, referred to as source selected information) indicating that the electronic device 10 is set to the source according to an operation input by a user through the switch 142 in step S104. In other words, the CPU 100 operates as the storage unit 100d that stores, in the nonvolatile memory 130, the state selected or set by a user through the operation acceptance unit 100a.

In the present embodiment, the power switch 110 is an alternate switch. In this configuration, when the electronic device 10 is automatically powered off, the actual power on/off of the electronic device 10 and the on/off state of the power switch 110 fail to coincide with each other. To avoid the disadvantage of this mismatch, the CPU 100 displays a message on the LCD 150 prompting the user to press the power switch 110 to power off the electronic device 10 in step S105.

In some examples, instead of or in addition to displaying a message, the CPU 100 controls the indicator lamp to change its lighting state to prompt the user to press the power switch 110 to power off the electronic device 10. In some other cases, the CPU 100 causes the speaker to output an alert sound instead of or in addition to notifying a user with a visual means (e.g., displaying a message or lighting an indicator lamp), to prompt the user to press the power switch 110 to power off the electronic device 10. In some still other cases, the CPU 100 causes a user to perceive vibration with the haptic device instead of or in addition to notifying a user with such visual means or acoustic means (e.g., outputting an alert sound), to prompt the user to press the power switch 110 to power off the electronic device 10.

In this configuration, the CPU 100 operates as the second notification unit 100e that notifies a user to power off the electronic device 10, in response to receiving an operation input by the user through the switch 142, by the operation acceptance unit 100a.

When the electronic device 10 is powered off by a user (YES in step S106), the CPU 100 sets the port of the electronic device 10 to the provider in step S107. More specifically, when the port of the electronic device 10 is set to the consumer, the cc terminal is switched from the pull-down state with the pull-down resistor to the pull-up state with the pull-up resistor (in other words, switched from the sink to the source), to switch from the consumer to the provider. When the port of the electronic device 10 is set to the provider, the state is maintained.

Switching the state of the electronic device 10 to the source while the external device at the state of the source is connected to the electronic device 10 might cause a collision between output of the electronic device 10 side and output of the external device 20. The following describes a case in which the external device 20 outputs a voltage of 5 V through the $V_{BUS}$ line, and the electronic device 10 outputs a voltage of 5.1 V through the $V_{BUS}$ line. In this case, a potential difference occurs between the electronic device 10 and the external device 20, and the power circuit 120 that outputs a voltage to the $V_{BUS}$ line might break in at least one of the electronic device 10 and the external device 20. To avoid such a failure, the electronic device 10 is to be electrically disconnected from the external device 20. For this purpose, the CPU 100 determines whether the external device 20 at the state of the source is connected to the electronic device 10 in step S108.

For example, when a voltage equal to or higher than a first threshold is applied to the $V_{BUS}$ terminal of the electronic device 10, the CPU 100 determines that the external device 20 at the sate of the source is connected to the electronic device 10. The first threshold value is, for example, a voltage (for example, 4.5 V) obtained by subtracting a predetermined margin from 4.75 V, which is a minimum value of vSafe 5 V for 5 V on the USB standard, or a voltage (for example, 1.0 V) obtained by adding a predetermined margin to 0.8 V, which is a maximum value of vSafe 0 V for 0 V on the USB standard.

When the external device 20 at the state of the source is connected to the electronic device 10 (YES in step S108), the above-described failure is to be avoided. The CPU 100 causes the LCD 150 to display a message prompting the user to electrically disconnect the external device 20 from the electronic device 10 in step S109. In some examples, the CPU 100 controls the indicator lamp to change its lighting state instead of or in addition to displaying the message to prompt the user to disconnect the external device 20 from the electronic device 10. In some other cases, the CPU 100 causes the speaker to output an alert sound instead of or in addition to notifying a user with a visual means (e.g., displaying a message or lighting an indicator lamp), to prompt the user to disconnect the external device from the electronic device 10. In some still other cases, the CPU 100 causes a user to perceive vibration with the haptic device instead of or in addition to notifying a user with such visual means or acoustic means (e.g., outputting an alert sound), to prompt the user to disconnect the external device 20 from the electronic device 10.

When the CPU 100 detects the disconnection of the external device 20 from the electronic device 10 (YES in step S110), the electronic device 10 is powered off, and the source is fixed as the state of the electronic device 10 in step S111. In other words, the CPU 100 powers off electronic device 10, stops the operations of the changeover switches SW1 and SW2, and maintains the cc terminal connected to the pull-up resistor during the power-off of the electronic device 10.

As described above, when the electronic apparatus 10 is powered off, the CPU 100 operates as the state fixing unit 100*f* that fixes, as the state of the electronic apparatus 10, the state selected by the user through the switch 142.

In step S108, the CPU 100 makes a negative determination (NO in step S108) when the external device 20 at the state of the sink is connected to the electronic device 10 or when the external device 20 is not connected to the electronic device 10. In this case, since the above-described failure does not occur, the CPU 100 powers off the electronic device 10 and fixes the state of the electronic device 10 to the source without causing the LCD 150 to display a message prompting a user to disconnect the external device 20 from the electronic device 10 in step S111.

When the electronic device 10 is set to the state of the consumer according to an operation input by a user through the switch 142 (NO in step S101), the CPU 100 stores, in the nonvolatile memory 130, the information (i.e., sink-selected information) indicating that the electronic device 10 is set to the sink according to an operation input by a user through the switch 142 in step S112. In other words, the CPU 100 operates as the storage unit 100*d* that stores, in the nonvolatile memory 130, the state selected or set by a user through the operation acceptance unit 100*a*.

After storing the sink-selected information in the nonvolatile memory 130, the CPU 100 determines whether the USB-PD non-compliant consumer is connected to the electronic device 10 (in other words, whether the sink is detected as the state of the external device 20 that is non-compliant with the USB-PD). In this case, if a USB-PD non-compliant sink is connected to the electronic device 10, the electronic device 10 that is at the state of the sink is unable to receive electric power from the external device 20. When a USB-PD non-compliant sink is connected to the electronic apparatus 10, the CPU 100 displays a message notifying that the state of the external apparatus 20 is sink, causes an indicator lamp to light up, outputs an alert sound, or causes a haptic device to generate vibration. In some examples, the CPU 100 displays a message, causes a indicator lamp to light up, outputs an alert sound, or causes a haptic device to generate vibration to prompt a user to disconnect the external device 20 from the electronic device 10.

The CPU 100 displays a message on the LCD 150, prompting the user to press the power switch 110 to power off the electronic device 10 in step S113. In this configuration, the CPU 100 operates as the second notification unit 100*e* that notifies a user to power off the electronic device 10, in response to receiving an operation input by the user through the switch 142, by the operation acceptance unit 100*a*.

When the electronic device 10 is powered off by a user (YES in step S114), the CPU 100 sets the port of the electronic device 10 to the consumer in step S115. More specifically, when the port of the electronic device 10 is set to the provider, the cc terminal is switched from the pull-up state with the pull-up resistor to the pull-down state with the pull-down resistor (in other words, switched from the source to the sink), to switch from the provider to the consumer. When the port of the electronic device 10 is set to the consumer, the state is maintained.

The CPU 100 powers off the electronic device 10 and fixes, as the state of the electronic device 10, the sink in step S116. In other words, the CPU 100 powers off electronic device 10, stops the operations of the changeover switches SW1 and SW2, and maintains the cc terminal connected to the pull-down resistor during the power-off of the electronic device 10. As described above, when the electronic apparatus 10 is powered off, the CPU 100 operates as the state fixing unit 100*f* that fixes, as the state of the electronic apparatus 10, the state selected by the user through the switch 142.

Figure 4:
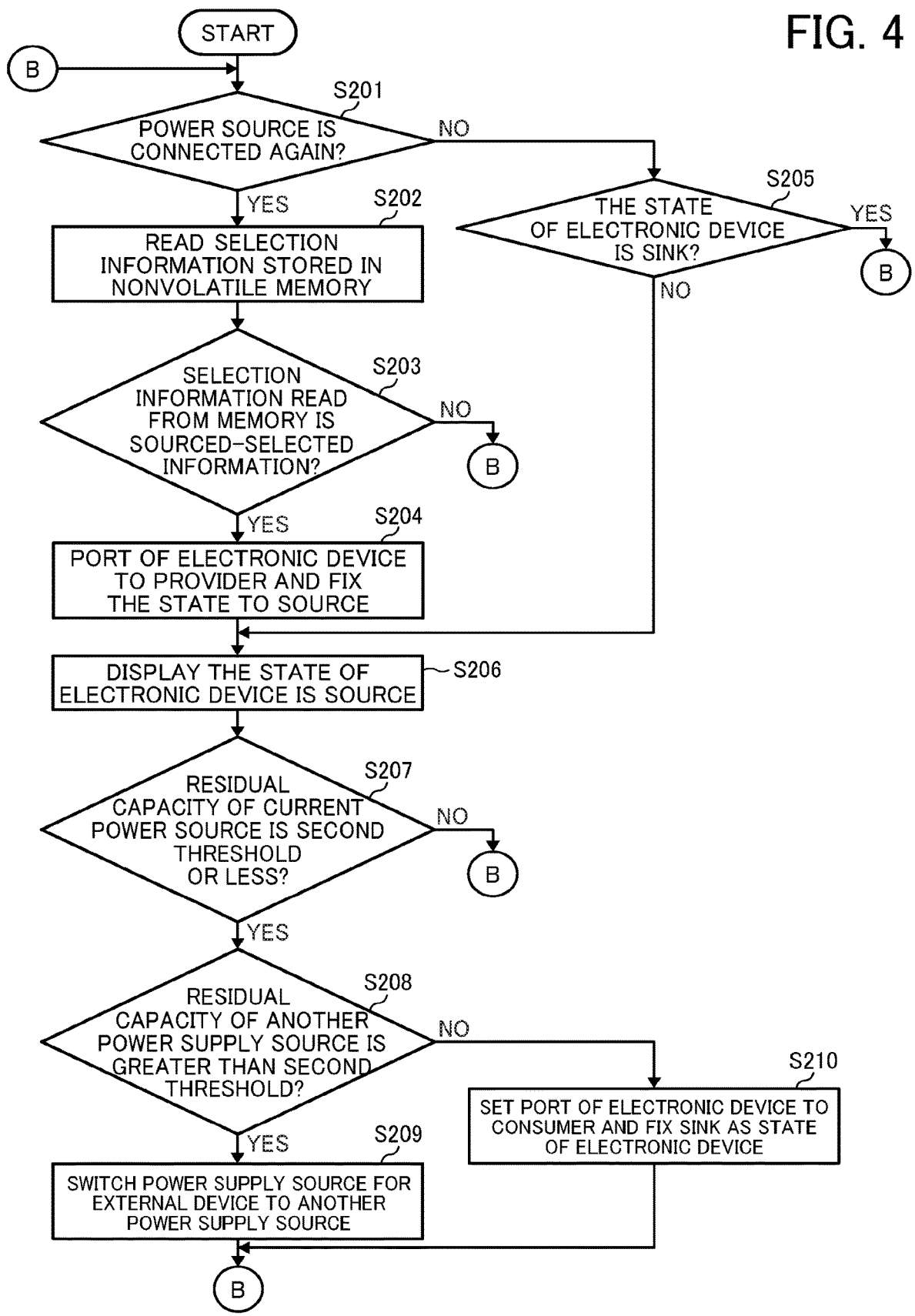
FIG. 4 is a flowchart of a process executed when the electronic device is powered off, according to an embodiment of the present disclosure.

FIG. 4 is a flowchart of a process executed by the CPU 100 when the electronic device 10 is powered off, according to an embodiment of the present disclosure. In the present embodiment, the process in FIG. 4 is executed after the state fixing process in FIG. 3. Further, the process in FIG. 4 ends in response to power-on of the electronic device 10.

The CPU 100 determines whether the electronic device 10 has changed from a state in which the electronic device 10 is not connected to any of the power supply sources (e.g., the commercial power supply, the battery 200, and the spare battery 30) to a state (hereinafter referred to as power-supply source reconnection state) in which the electronic device 10 is connected to any of the power supply sources in step S201. When the electronic device 10 has changed to the power-supply source reconnection state (YES in step S201), the CPU 100 proceeds to the process in step S202. In the power-supply source reconnection state, for example, the electronic device 10, from which the battery 200 is detached, is not connected with any of the power supply sources after the state fixing process in FIG. 3 has been executed.

Upon detecting that a routine (for example, an initialization routine) that is executed only once at the time of startup of the system has been executed after starting the execution of the control program, the CPU 100 determines that the electronic device 10 has changed to the power-supply source reconnection state.

In step S202, the CPU 100 reads selection information (e.g., the source-selected information or the sink-selected information) stored in the nonvolatile memory 130. Next, the CPU 100 determines whether the read selection information is the source-selected information in step S203.

In the present embodiment, the electronic device 10 that is at the power-supply source reconnection state after battery exchange is assumed to be at the state of the source (i.e., the electronic device 10 is not desired to operate as a power-supplying side according to a user's operation). Based on such an assumption, the port of the electronic device 10 is set to the state of the consumer, and the sink is fixed as the state of the electronic device 10. When the selection information read in step S202 is the sink-selected information (NO in step S203), the CPU 100 returns to the process in step S201 without changing the state of the electronic device 10 from the sink.

When the selection information read in step S202 is the source-selected information (NO in step S203), the CPU 100 sets the port of the electronic device 10 to the provider and fixes the source as the state of the electronic device 10 in step S204, and proceeds to the process in step S206. This configuration enables the source or the sink to be fixed as the state of the electronic device 10, according to a selection input by a user without operating the electronic device 10 even when the battery 200 is attached to the electronic device 10 again.

In other words, the CPU 100 that operates as the state fixing unit 100*f* fixes, as the state of the electronic device 10, the state stored in the nonvolatile memory 130 when the battery 200 becomes connected to the electronic device 10.

In some examples, the processes in steps S201 to S204 are omitted. In this case, when the electronic device 10 gets into the power-supply source reconnection state, the CPU 100 sets the port of the electronic device 10 to the consumer and fixes the sink as the state of the electronic device 10, irrespective of the selection information stored in the nonvolatile memory 130.

When the electronic device 10 is not at the power-supply source reconnection state (NO in step S201), the CPU 100 determines whether the state of the electronic device 10 is the sink in step S205. When the port of the electronic device 10 is a provider, the electronic device 10 is not at the power-supply source reconnection state. Based on that, in some example, the CPU 100 determines whether the electronic device 10 is at the power-supply source reconnection state based on whether the port of the electronic device 10 is set to the provider, in step 201. When the state of the electronic device 10 is the sink (YES in step S205), the CPU 100 returns to the process in step S201. When the state of the electronic device 10 is the source (NO in step S205), the CPU 100 proceeds to the process in step S206.

In step S206, the CPU 100 causes the LCD 150 to display a message that the state of the electronic device 10 is the source. In some examples, the CPU 100 controls the indicator lamp to change its lighting state instead of or in addition to displaying such a message on the LCD 150 to notify a user that the state of the electronic device 10 is the source. In some other cases, the CPU 100 causes the speaker to output an alert sound instead of or in addition to notifying a user with a visual means (e.g., displaying a message or lighting an indicator lamp), to notify a user that the state of the electronic device 10 is the source. In some still other cases, the CPU 100 causes a user to perceive vibration with the haptic device instead of in addition to notifying a user with such visual means or acoustic means (e.g., outputting an alert sound), to notify a user that the state of the electronic device 10 is the source.

The processes in steps S207 to S210 are executed when the battery 200 and the spare battery 30 are attached to the electronic device 10, and the currently power supply source (e.g., the power supply source that supplies electric power to the external device 20 in this example) of the electronic device 10 is one of the battery 200 and the spare battery 30. If such conditions are not met, the process returns to the step S201.

When the state of the electronic device 10 is the source, the residual capacity of the current power supply source gradually decreases. The residual capacity of the current power supply source is saved to some extent, to allow the electronic device 10 to operate at the time of start up of the system. For this reason, the CPU 100 determines whether the residual capacity of the current power supply source is less than or equal to a second threshold value (i.e., a predetermined threshold) in step S207.

In the present embodiment, the second threshold value is 50%. This value is only an example. In some examples, the second threshold value is a lower value such as 20% or 30%. In some other examples, the second threshold value is any desired value set according to an operation input by a user through the setting switch group 140.

When the current residual capacity of the power supply source is larger than the second threshold value (NO in step S207), the process returns to step S201.

When the residual capacity of the current power supply source is equal to or less than the second threshold (YES in step S207), the CPU 100 determines whether the residual capacity of the other power supply source is greater than the second threshold value (i.e., the predetermined threshold) in step S208. When the current power supply source is the battery 200, the CPU 100 determines whether the residual capacity of the spare battery 30 is greater than the second threshold value. In contrast, when the current power supply source is the spare battery 30, the CPU 100 determines whether the residual capacity of the battery 200 is greater than the second threshold value.

In some examples, the battery 200 or the spare battery 30 is preliminarily determined as the default power supply source, that is, the current power supply source, during the power-off of the electronic device 10. Further, in some other examples, the default power supply source is set according to an operation input by a user through the setting switch group 140. In the above description, the same threshold value (i.e., the second threshold value) is set for the battery 200 and the spare battery 30. However, this is only one example. In some examples, a different threshold value is set for each power supply source.

When the residual capacity of the other power supply source is greater than the second threshold value (YES in step S208), the CPU 100 switches the power supply source for the external device 20 to the other power supply source in step S209, and returns to the process in step S201. This configuration prevents a reduction in the residual capacity of the power supply source (i.e., the current power supply source) before switching to another one, to a degree that causes the electronic device 10 to be inoperable at the time of start up of the system.

In this configuration, the CPU 100 operates as a check unit 100g that checks the residual capacity of the battery 200 and the spare battery 30. The CPU 100 operates as a power supply source switching unit 100h that switches a power supply source for supplying power to the external device 20 between the battery 200 and the spare battery 30. More specifically, the CPU 100 operating as the power supply source switching unit 100h switches the power supply source from one of the battery 200 and the spare battery 30 to the other one, based on the determination of the check unit 100g that the residual capacity of the current power supply source is less than or equal to the predetermined threshold value, in the electronic device 10, which is connected to the battery 200 and the spare battery 30, is at the state of the source.

In step S207, when the residual capacity of the current power supply source is equal to or less than the second threshold value (YES in step S207), the CPU 100 causes the current power supply source to stop supplying electric power to the external device 20 by electrically disconnecting from the external device 20, to allow the electronic device 10 to wait with its port set to neither of the provider nor the consumer. Such a state in which the port of the electronic device 10 is set to neither of the provider nor the consumer means that the electronic device 10, which is connected to the external device 20 through the USB cable 40, is electrically disconnected from the external device 20 so as not to supply electric power to and receive electric power from the external device 20. This configuration that enables the electronic device 10 to wait in such a condition reduces the power consumption of the electronic device 10 and the external device 20.

For the external device 20 as a DRP device, which is connected to the electronic device 10, when the electronic device 10 is switched from the source to the sink, the external device 20 is switched from the sink to the source. The following describes a case in which the external device 20 is a mobile battery with a port of the DRP. In this case, if the electronic device 10 is automatically switched to the sink, the mobile battery charged by the electronic device 10 might discharge electric power by starting to charge the electronic device without the user's noticing it. Such an inconvenience, however, can be avoided by setting the port of the electronic device 10 on standby to neither of the provider nor the consumer.

When the residual capacity of the other power supply source is less than or equal to the second threshold value (NO in step S208), the CPU 100 changes the setting of the port of the electronic device 10 from the provider to the consumer and fixes, as the state of the electronic device 10, the sink in step S210. This can save the residual capacity of both the battery 200 and the spare battery 30 to operate the electronic device 10 at the time of start up of the system.

In some examples, instead of executing the process in step S210, the CPU 100 cuts off the power supply from the current power supply source to the external device 20 without changing the setting of the port of the electronic device 10 from the provider.

In some other examples, instead of executing the process in step S210, the CPU 100 causes the current power supply source to stop supplying electric power to the external device by electrically disconnecting from the external device 20 so as to set the port of the electronic device 10 to neither of the provider nor the consumer.

The process in FIG. 5 starts in response to power-on of the electronic device 10 during the execution of the process in FIG. 4. The process in FIG. 5 is executed to set the state of the powered-on electronic device 10 to the sink.

Specifically, in response to power-on of the electronic device 10 according to an operation input by a user to power on the electronic device 10, the CPU 100 sets the port of the electronic device 10 to the consumer and fixes the sink as the state of the electronic device in step S301. More specifically, when the port of the electronic device 10 is set to the provider, the CPU 100 switches the setting from the provider to the consumer and fixes the sink as the state of the electronic device 10. In contrast, when the port of the electronic device 10 is set to the sink, the CPU 100 maintains the state (sink).

In this configuration, the CPU 100 operating as the state fixing unit 100f fixes, as the state of the electronic device 10, the sink in response to power-on of the electronic device 10.

The above-described disadvantage (if the electronic device 10 is automatically switched from the source to the sink, the mobile battery charged by the electronic device 10 might discharge electric power by starting to charge the electronic device 10 without the user's noticing it) might occur.

To avoid such a disadvantage, the CPU 100 determines whether a DRP device as the external device 20 is connected to the electronic device 10 in step S302. The CPU 100 determines whether the DRP device is connected to the electronic apparatus 10 based on a response, from the external apparatus 20 side, to a message transmitted to switch the state of the electronic device 10 from one of the source and the sink to the other one.

When the DRP device is connected to the electronic device 10 (YES in step S302), the CPU 100 causes the LCD 150 to display a message notifying that the electronic device 10 is automatically switched to the sink in step S303, to alert the user. When the electronic device 10 is originally at the state of a sink, the above disadvantage does not occur. In this case, the status of the electronic device 10 is simply displayed on the LCD 150 instead of alerting the user.

In some examples, the CPU 100 alerts the user by controlling the indicator lamp to change its lighting state instead of or in addition to displaying the message on the LCD 150. In some other cases, the CPU 100 alerts the user by causing the speaker to output an alert sound instead of or in addition to notifying a user with a visual means (e.g., displaying a message or lighting an indicator lamp). In some still other cases, the CPU 100 alerts the user by causing a user to perceive vibration with the haptic device instead of or in addition to notifying a user with such visual means or acoustic means (e.g., outputting an alert sound).

In this example, the CPU 100 operates as a connection detection unit 100i that detects whether a DRP device (i.e., the external device 20 that is switchable between the source that enables electric power to be supplied to the electronic device 10 and the sink that enables electric power to be received from the electronic device 10) is connected to the electronic device 10. In addition, the CPU 100 operates as a third notification unit 100j that notifies a user that the state of the electronic device 10 is the sink, in response to the detection of the connection detector 100i that the DRP device is connected to the powered-on electronic device 10, as the state of which, the source is fixed.

Notably, when the DRP device is connected to the electronic device 10 (YES in step S302), the CPU 100 forcibly electrically disconnects the DRP device from the electronic device to avoid occurrence of the above-described disadvantage. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:
1. An electronic device electrically connectable to an external device, the electronic device comprising:
 circuitry configured to:
  accept, from a user, a selection of one of:
   a first state that enables the electronic device to supply electric power to the external device; and
   a second state that enables the electronic device to receive electric power from the external device; and
  switch a state of the electronic device to the selected one of the first state and the second state and fix the selected one of the first state and the second state as the state of the electronic device in response to power off of the electronic device,
 wherein the circuitry is further configured to:
  detect whether the external device connected to the electronic device is able to receive electric power from the electronic device; and
  notify the user to disconnect the external device from the electronic device, in response to a detection that the external device is unable to receive electric power from the electronic device for which the selected one of the first state and the second state is the first state.

2. The electronic device according to claim 1,
wherein the circuitry is further configured to notify the user to power off the electronic device in response to accepting the selection from the user.

3. The electronic device according to claim 1, further comprising:
a first battery detachably connected to the electronic device, the first battery configured to:
at the first state, supply electric power to the external device so as to discharge; and
at the second state, receive electric power from the external device so as to be charged; and
a memory,
wherein the circuitry is further configured to:
store, in the memory, the selected one of the first state and the second state; and
fix, as the state of the electronic device, the selected one of the first state and the second state stored in the memory, in response to connection of the first battery to the electronic device.

4. The electronic device according to claim 1,
wherein the circuitry is further configured to fix the second state as the state of the electronic device, in response to power on of the electronic device.

5. The electronic device according to claim 4,
wherein the external device is switchable between a state in which electric power is suppliable to the electronic device and another state in which electronic power is receivable from the electronic device,
wherein the circuitry is further configured to:
detect whether the electronic device is connected to the external device; and
notify the user that the electronic device is at the second state, based on a detection that the electronic device is connected to the external device, after the fixing of the second state as the state of the electronic device in response to power on of the electronic device.

6. An electronic device electrically connectable to an external device, the electronic device comprising:
circuitry configured to:
accept, from a user, a selection of one of:
a first state that enables the electronic device to supply electric power to the external device; and
a second state that enables the electronic device to receive electric power from the external device; and
switch a state of the electronic device to the selected one of the first state and the second state and fix the selected one of the first state and the second state as the state of the electronic device in response to power off of the electronic device,
the electronic device further comprising:
a first battery detachably connected to the electronic device, the first battery configured to:
at the first state, supply electric power to the external device so as to discharge; and
at the second state, receive electric power from the external device so as to be charged; and
a memory,
wherein the circuitry is further configured to:
store, in the memory, the selected one of the first state and the second state; and
fix, as the state of the electronic device, the selected one of the first state and the second state stored in the memory, in response to connection of the first battery to the electronic device,
the electronic device further comprising a second battery detachably connected to the electronic device; and
wherein one of the first battery and the second battery is a current power supply source configured to supply electric power to the external device,
wherein the circuitry is further configured to:
check residual capacity of the current power supply source;
determine, at the first state, whether the checked residual capacity of the current power supply source is less than or equal to a predetermined threshold value; and
based on a determination that the checked residual capacity of the current power supply source is less than or equal to the predetermined threshold value, switch the current power supply source from the one of the first battery and the second battery to the other.

7. A method executed by an electronic device connectable to an external device, the method comprising:
receiving, from a user, a selection of one of:
a first state that enables the electronic device to supply electric power to the external device; and
a second state that enables the electronic device to receive electric power from the external device;
switching a state of the electronic device to the selected one of the first state and the second state and fixing the selected one of the first state and the second state as the state of the electronic device in response to power off of the electronic device; and
notifying the user to power off the electronic device in response to receiving the selection from the user.

* * * * *